(12) United States Patent
Konishi et al.

(10) Patent No.: US 12,140,823 B2
(45) Date of Patent: Nov. 12, 2024

(54) ARBITRARY WAVEFORM GENERATION DEVICE AND ARBITRARY WAVEFORM GENERATION METHOD

(71) Applicant: OSAKA UNIVERSITY, Osaka (JP)

(72) Inventors: Tsuyoshi Konishi, Osaka (JP); Yuta Kaihori, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 256 days.

(21) Appl. No.: 17/769,928

(22) PCT Filed: Sep. 30, 2020

(86) PCT No.: PCT/JP2020/037345
§ 371 (c)(1),
(2) Date: Apr. 18, 2022

(87) PCT Pub. No.: WO2021/079710
PCT Pub. Date: Apr. 29, 2021

(65) Prior Publication Data
US 2022/0390772 A1    Dec. 8, 2022

(30) Foreign Application Priority Data
Oct. 23, 2019   (JP) .................... 2019-192780

(51) Int. Cl.
*G06F 1/02* (2006.01)
*G02F 1/01* (2006.01)
*G02F 2/00* (2006.01)

(52) U.S. Cl.
CPC .............. *G02F 1/0126* (2013.01); *G02F 2/00* (2013.01); *G06F 1/02* (2013.01)

(58) Field of Classification Search
CPC ....................................................... G06F 1/022
See application file for complete search history.

(56) References Cited

U.S. PATENT DOCUMENTS

| 6,671,298 B1* | 12/2003 | Delfyett | H04B 10/506 372/9 |
| 2002/0097176 A1* | 7/2002 | Herbold | H03L 7/16 341/155 |
| 2013/0228688 A1* | 9/2013 | Plusquellic | G01J 3/4338 250/504 R |

OTHER PUBLICATIONS

Chou et al., Adaptive RF-Photonic Arbitrary Waveform Generator, IEEE Photonics Technology Letters, vol. 15, No. 4, Apr. 2003 (Year: 2003).*

(Continued)

*Primary Examiner* — Charlie Y Peng
(74) *Attorney, Agent, or Firm* — Wenderoth, Lind & Ponack, L.L.P.

(57) ABSTRACT

An arbitrary waveform generation device is an arbitrary waveform generation device that generates, from an arbitrary waveform of a first electrical signal, an arbitrary waveform of a second electrical signal having a frequency higher than a frequency of the first electrical signal, and includes: a modulator that modulates, with the first electrical signal, an optical carrier wave which is dispersed to have a central wavelength that varies with time; a dispersion compensator that performs dispersion compensation on the optical carrier wave modulated with the first electrical signal; and a photoelectric converter that converts the optical carrier wave which has been dispersion-compensated into an electrical signal to generate the second electrical signal.

6 Claims, 5 Drawing Sheets

(56) References Cited

OTHER PUBLICATIONS

J. Yao, "Photonic generation of microwave arbitrary waveforms," 16th Opto-Electronics and Communications Conference, Kaohsiung, Taiwan, 2011, pp. 356-357. (Year: 2011).*
English translation of CN 103560769 A (Year: 2014).*
International Search Report (ISR) issued on Dec. 8, 2020 in International (PCT) Application No. PCT/JP2020/037345.
Ming Li, et. al., "Recent progresses on optical arbitrary waveform generation", Frontiers of Optoelectronics, vol. 7, Issue 3, pp. 359-375, Sep. 2014.
Jason Chou, et. al., "Adaptive RF-Photonic Arbitrary Waveform Generator", IEEE Photonics Technology Letters, vol. 15, Issue 4, pp. 581-583, Apr. 2003.
Yao, J., "Photonic generation of microwave arbitrary waveforms," Optics Communications, vol. 284, pp. 3723-3736, Mar. 2011.
Office Action mailed on Mar. 5, 2024 issued for corresponding JP patent application No. 2021-554219 and its Machine translation, 7 pages.

* cited by examiner

ARBITRARY WAVEFORM GENERATION DEVICE AND ARBITRARY WAVEFORM GENERATION METHOD

TECHNICAL FIELD

The present invention relates to an arbitrary waveform generation device and an arbitrary waveform generation method that generate, from an arbitrary waveform of a first electrical signal, an arbitrary waveform of a second electrical signal which has a higher frequency than the first electrical signal.

BACKGROUND ART

In the fifth-generation mobile communication system (5G), the use of microwaves which have a higher frequency band (for example, a band of at least 6 gigahertz) than that which is conventional is being studied. For this reason, microwave arbitrary waveform generation techniques for use in communication device testing, and the like, are attracting attention.

Non Patent Literature (NPL) 1 and NPL 2 disclose a technique of generating a microwave arbitrary waveform using an optical pulse. In this technique, first, the spectrum of an optical pulse is shaped in the spectral domain, using an optical wavelength selection switch that uses liquid crystal on silicon (LCOS). Then, the optical pulse for which the spectrum has been shaped is temporally stretched using a dispersion device. By photoelectric conversion of the light that has been stretched in the above manner, a microwave arbitrary waveform is generated.

CITATION LIST

Non Patent Literature

[NPL 1] Ming Li, et. al., "Recent progresses on optical arbitrary waveform generation", Frontiers of Optoelectronics, Volume 7, Issue 3, pp. 359-375, September 2014
[NPL 2] Jason Chou, et. al., "Adaptive RF-photonic arbitrary waveform generator", IEEE Photonics Technology Letters, Volume 15, Issue 4, pp. 581-583, April 2003

SUMMARY OF INVENTION

Technical Problem

However, the above-described conventional technique requires an extremely expensive optical wavelength selection switch in order to shape the spectrum of an optical puke in the spectral domain.

In view of this, the present invention provides an arbitrary waveform generation device and an arbitrary waveform generation method that are capable of generating an arbitrary waveform of a microwave without performing spectral shaping of an optical pulse in the spectral domain,

Solution to Problem

An arbitrary waveform generation device according to an aspect of the present invention is an arbitrary waveform generation device that generates, from an arbitrary waveform of a first electrical signal, an arbitrary waveform of a second electrical signal having a frequency higher than a frequency of the first electrical signal, and includes: a modulator that modulates, with the first electrical signal, an optical carrier wave which is dispersed to have a central wavelength that varies with time; a dispersion compensator that performs dispersion compensation on the optical carrier wave modulated with the first electrical signal; and a photoelectric converter that converts the optical carrier wave which has been dispersion-compensated into an electrical signal to generate the second electrical signal.

It should be noted that these generic and specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Advantageous Effects of Invention

An arbitrary waveform generation device according to an aspect of the present invention is capable of generating an arbitrary waveform of a microwave without performing spectral shaping of an optical pulse in the spectral domain.

DESCRIPTION OF EMBODIMENTS

Hereinafter, embodiments will be specifically described with reference to the Drawings.

Furthermore, each of the embodiments described below shows a generic or specific example. The numerical values, shapes, materials, structural components, the arrangement and connection of the structural components, steps, the processing order of the steps, etc., shown in the following embodiments are mere examples, and are therefore not intended to limit the claims.

Furthermore, the respective figures are not necessarily precise illustrations, In the figures, components which are substantially the same are given the same reference signs, and overlapping description is omitted or simplified,

Embodiment

[Configuration of Arbitrary Waveform Generation Device 100]

Figure 1:
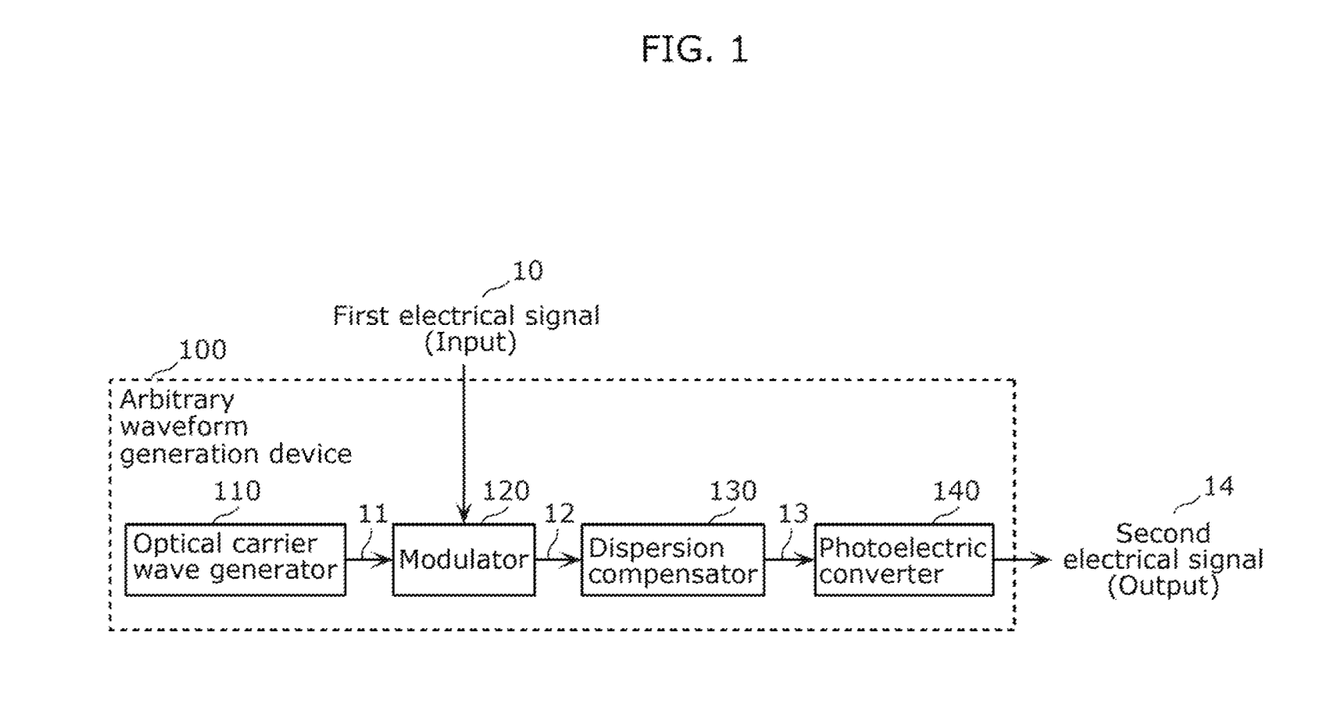
FIG. 1 is a block diagram illustrating a configuration of an arbitrary waveform generation device according to an embodiment.

First, arbitrary waveform generation device 100 according to the present embodiment will be described with reference to FIG. 1. FIG. 1 is a block diagram illustrating the configuration of arbitrary waveform generation device 100 according to the embodiment.

Arbitrary waveform generation device 100 according to the present embodiment generates, from an arbitrary waveform of first electrical signal 10, an arbitrary waveform of second electrical signal 14 which has a higher frequency than first electrical signal 10. As illustrated in FIG. 1, arbitrary waveform generation device 100 includes optical carrier wave generator 110, modulator 120, dispersion compensator 130, and photoelectric converter 140.

Optical carrier wave generator 110 generates optical carrier wave 11 that is dispersed to have a central wavelength that varies with time. In the present embodiment, optical carrier wave generator 110 generates optical carrier wave 11 having a central wavelength that increases with time. In this case, a first central wavelength of a first portion of optical carrier wave 11 is shorter than a second central wavelength of a second portion of optical carrier wave 11 which is located temporally after the first portion.

Figure 2A:
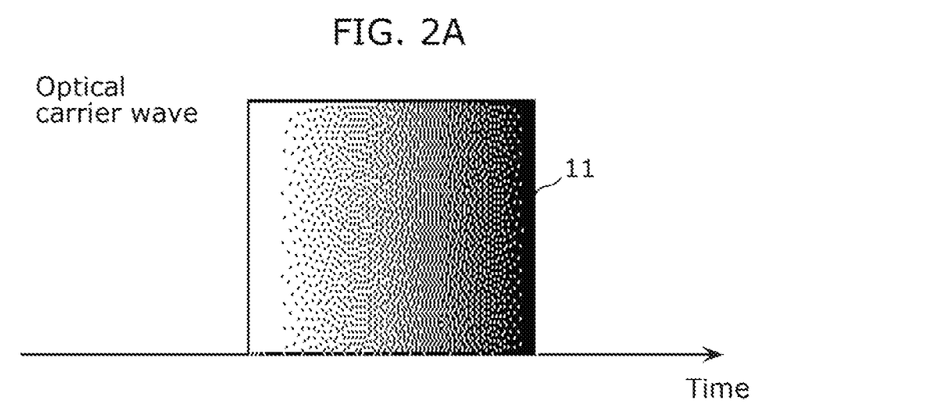
FIG. 2A is a diagram illustrating an example of an optical carrier wave in the embodiment.

FIG. 2A is a diagram illustrating an example of optical carrier wave 11 in the embodiment. In FIG. 2A to FIG. 2E, the horizontal axis shows time and the vertical axis shows strength (amplitude). Furthermore, in FIG. 2A, FIG. 2C, and FIG. 2D, the central wavelength of light is indicated by dots, and an increase in dot density shows an increase in the central wavelength. Specifically, FIG. 2A illustrates optical carrier wave 11 whose arrival time to a predetermined place is faster as the central wavelength of light is shorter, and whose arrival time to the predetermined place is slower as the central wavelength of light is longer.

As described above, the central wavelength of optical carrier wave 11 varies with time. Specifically, optical carrier wave 11 is equivalent to wavelength-dispersed light. For the variation range of the central wavelength of optical carrier wave 11, a predetermined range falling within 1500 to 1600 nanometers, for example, can be used. Furthermore, for the duration of optical carrier wave 11, about several tens of nanoseconds, for example, can be used. It should be noted that the central wavelength and the duration of optical carrier wave 11 are neither limited to the above nor limited to the frequency band of second electrical signal 14. Furthermore, as long as optical carrier wave 11 having a central wavelength that varies with time can be obtained, any light source may be used as the light source of optical carrier wave 11.

It should be noted that optical carrier wave generator 110 need not be included in arbitrary waveform generation device 100. In this case, arbitrary waveform generation device 100 may receive an input of optical carrier wave 11 from the outside.

Modulator 120 modulates optical carrier wave 11 with first electrical signal 10, and outputs optical carrier wave 12 which has been modulated. Modulator 120 is, for example, an electro-optic modulator (EOM), and causes the amplitude of optical carrier wave 11 to change based on first electrical signal 10. As modulator 120, for example, an LN modulator, an EA modulator, an AO modulator, or the like can be used, but the modulator is not limited to these.

Figure 2B:
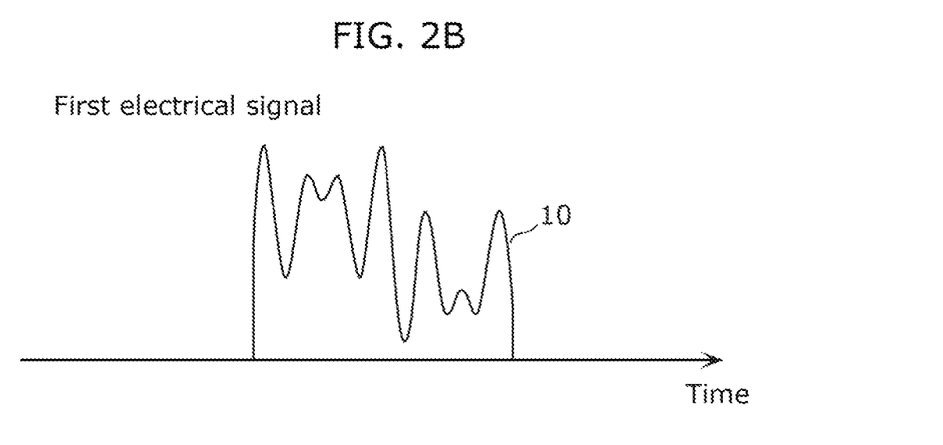
FIG. 2B is a diagram illustrating an example of a first electrical signal in the embodiment.

FIG. 2B is a diagram illustrating an example of first electrical signal 10 in the embodiment. First electrical signal 10 is, for example, an RF signal which can be generated using a common arbitrary waveform generator (AWG) and is in a band ranging from at least 1 kilohertz to below 100 megahertz.

Figure 2C:
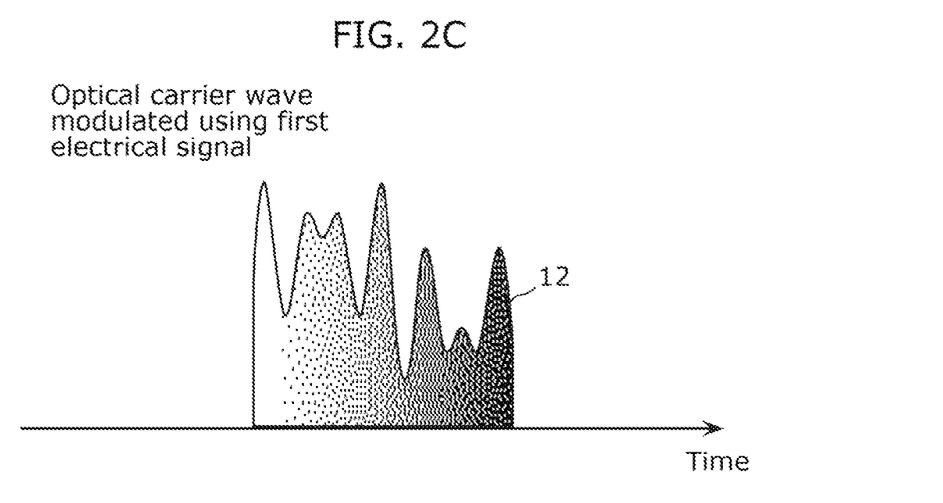
FIG. 2C is a diagram illustrating an example of an optical carrier wave that has been modulated with the first electrical signal, in the embodiment.

FIG. 2C is a is a diagram illustrating an example of optical carrier wave 12 that has been modulated with first electrical signal 10 in the embodiment. Here, optical carrier wave 12 has been amplitude-modulated, and the amplitude (strength) of modulated optical carrier wave 12 changes based on first electrical signal 10. Furthermore, the central wavelength of modulated optical carrier wave 12 increases with time in the same manner as optical carrier wave 11.

Dispersion compensator 130 performs dispersion compensation on optical carrier wave 12 which has been modulated with first electrical signal 10, and outputs dispersion-compensated optical carrier wave 13. Specifically, dispersion compensator 130 compensates for the wavelength dispersion in modulated optical carrier wave 12 to temporally contract modulated optical carrier wave 12. As dispersion compensator 130, an optical dispersion medium (for example, an optical fiber and/or an optical waveguide device, etc.) can be used. Furthermore, as dispersion compensator 130, an optical circulator and a Chirped Fiber Bragg Grating (CFBG) can also be used. In the present embodiment, the central wavelength of modulated optical carrier wave 12 increases with time, and thus an optical dispersion medium (for example, a single mode fiber) in which the propagation time of light decreases as the wavelength of light increases can be used as dispersion compensator 130.

Figure 2D:
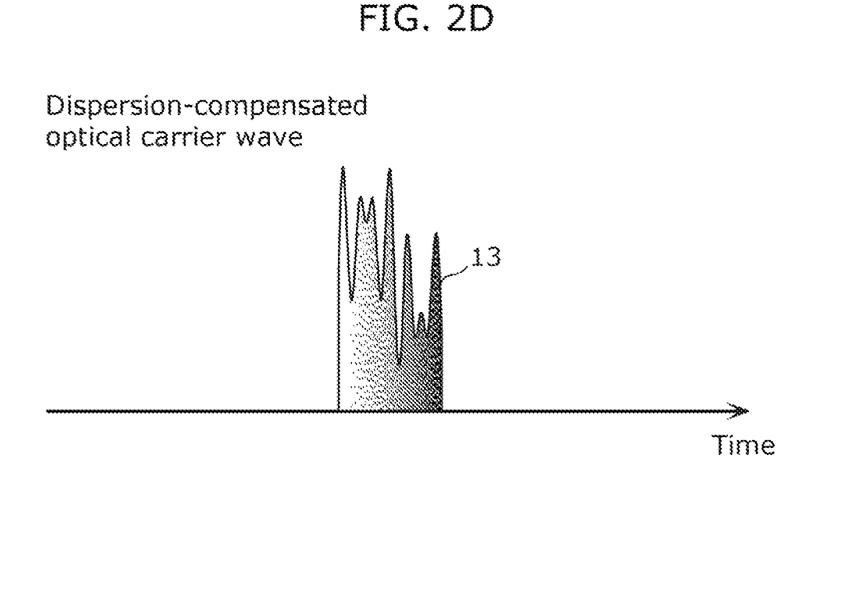
FIG. 2D is a diagram illustrating an example of an optical carrier wave that has been dispersion compensated, in the embodiment.

FIG. 2D is a diagram illustrating an example of dispersion-compensated optical carrier wave 13 in the embodiment. As illustrated in FIG. 2D, dispersion-compensated optical carrier wave 13 is equivalent to a temporally-contracted duplicate of modulated optical carrier wave 12.

Photoelectric converter 140 generates second electrical signal 14 by converting dispersion-compensated optical carrier wave 13 into an electrical signal. As photoelectric converter 140, for example, a photodiode can be used, but the photoelectric converter is not limited to this.

Figure 2E:
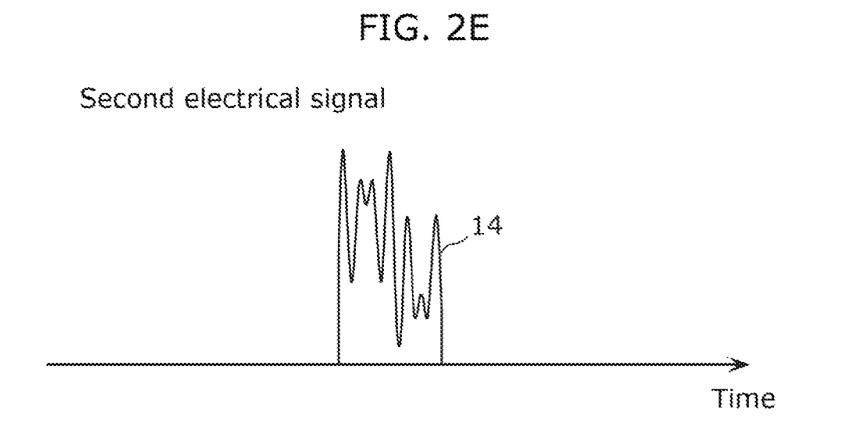
FIG. 2E is a diagram illustrating an example of a second electrical signal in the embodiment.

FIG. 2E is a is a diagram illustrating an example of second electrical signal 14 in the embodiment. Second electrical signal 14 has a higher frequency than first electrical signal 10. For example, second electrical signal 14 is an RF signal in a band ranging from at least 100 megahertz to below 100 gigahertz. Second electrical signal 14 is equivalent to a temporally-contracted duplicate of first electrical signal 10.

[Configuration of Optical Carrier Wave Generator]

Next, some example configurations of optical carrier wave generator 110 will be described with reference to FIG. 3A and FIG. 3B.

Figure 3A:
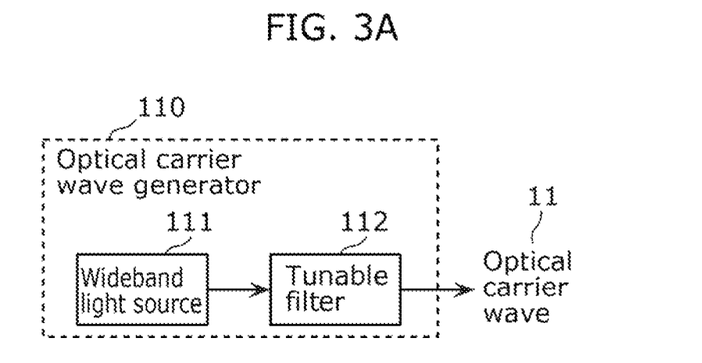
FIG. 3A is a block diagram illustrating a first example of an internal configuration of an optical carrier wave generator in the embodiment.

FIG. 3A is a block diagram illustrating a first example of an internal configuration of optical carrier wave generator 110 in the embodiment. Optical carrier wave generator 110 generates optical carrier wave 11 from light having a predetermined wavelength band, using a tunable filter. In FIG. 3A, optical carrier wave generator 110 includes wideband light source 111 and tunable filter 112.

Wideband light source 111 generates light of a predetermined wavelength range. Specifically, wideband light source 111 generates light having a continuous spectrum in a predetermined wavelength range. For the predetermined wavelength range, for example, a range of between 1200 to 1700 nanometers can be used, but the predetermined wavelength range is not limited to this range.

Tunable filter 112 is an optical filter having a variable transmission wavelength band, and generates, from the light of a predetermined wavelength range outputted from wideband light source 111, optical carrier wave 11 which is dispersed to have a central wavelength that varies with time. As tunable filter 112, for example, a Mach-Zehnder modulator (MZM) can be used, but the tunable filter is not limited to this.

Figure 3B:
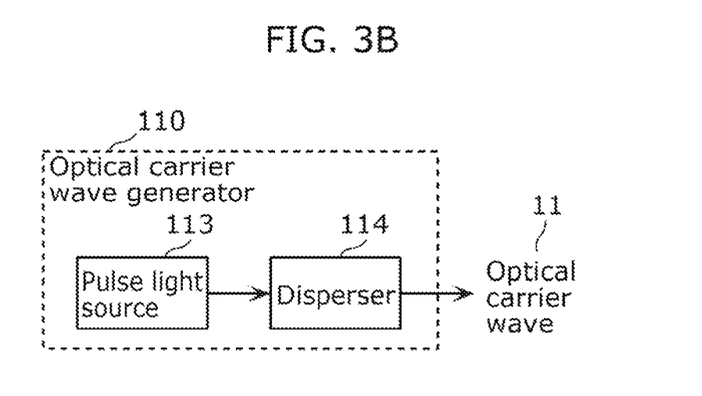
FIG. 3B is a block diagram illustrating a second example of an internal configuration of an optical carrier wave generator in the embodiment.

FIG. 3B is a block diagram illustrating a second example of an internal configuration of optical carrier wave generator 110 in the embodiment. In FIG. 3B, optical carrier wave generator 110 includes pulse light source 113 and disperser 114.

Pulse light source 113 generates an optical pulse. As pulse light source 113, for example, a mode-locked fiber laser (MLFL) can be used, but the pulse light source is not limited to this.

Disperser 114 performs wavelength dispersion on the optical pulse outputted from pulse light source 113 to generate optical carrier wave 11 which is dispersed to have a central wavelength that varies with time. Specifically, disperser 114 temporally expands the optical pulse.

Here, the effect of the wavelength dispersion by disperser 114 is greater than the effect of the dispersion compensation by dispersion compensator 130. Accordingly, optical carrier wave 13 outputted from dispersion compensator 130 does not return to an optical pulse, and becomes a light from which microwaves can be obtained by photoelectric conversion.

As disperser 114, an optical dispersion medium (for example, an optical fiber and/or an optical waveguide device, etc.) can be used. Furthermore, as disperser 114, an optical circulator and a CFBG can also be used. In the present embodiment, by using, for example, an optical dispersion medium (for example, a dispersion compensation fiber, etc.) in which the propagation time of light increases as the wavelength of light increases, as disperser 114, it is possible to cause the central wavelength of optical carrier wave 11 to increase with time.

It should be noted that the configuration of optical carrier wave generator 110 is not limited to the configurations in FIG. 3A and FIG. 3B. As long as optical carrier wave 11 which is dispersed to have a central wavelength that varies with time can be obtained, any light source may be used, and any technique may be used. Furthermore, as long as first electrical signal 10 can be sampled, optical carrier wave 11 need not be a temporally continuous light, and may be an intermittent light.

[Arbitrary Waveform Generation Method]

Figure 4:
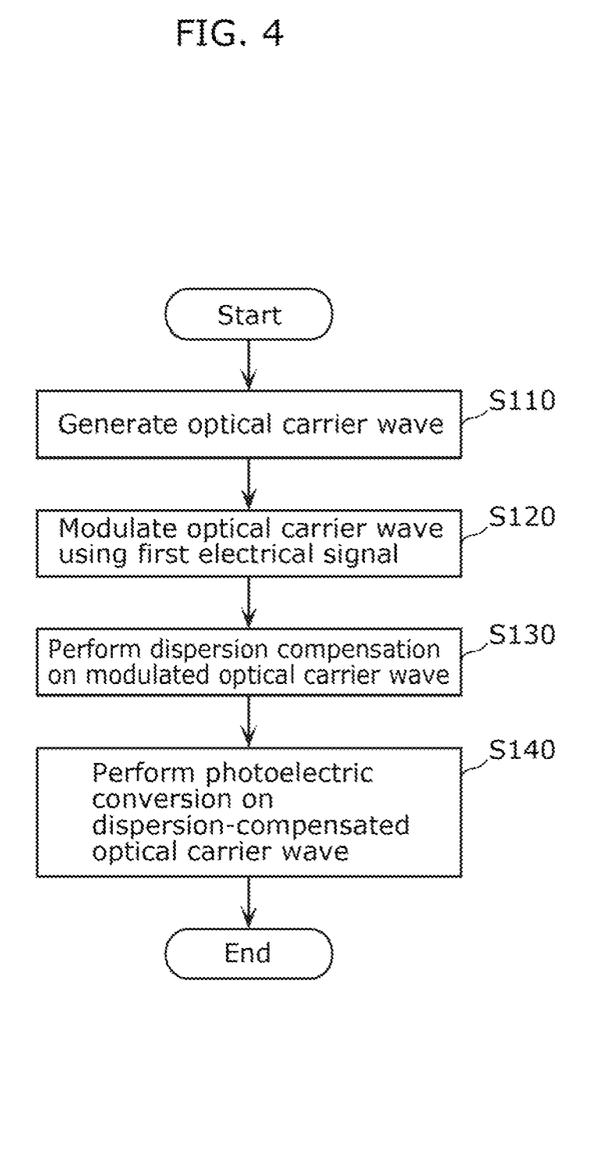
FIG. 4 is a flowchart illustrating an arbitrary waveform generation method according to the embodiment.

The arbitrary waveform generation method performed by arbitrary waveform generation device 100 configured in the above-described manner will be described with reference to FIG. 4. FIG. 4 is a flowchart illustrating an arbitrary waveform generation method according to the embodiment.

First, optical carrier wave generator 110 generates optical carrier wave 11 which is dispersed to have a central wavelength that varies with time (S110). Modulator 120 modulates optical carrier wave 11 with first electrical signal 10 (S120). Dispersion compensator 130 performs dispersion compensation on modulated optical carrier wave 12 (S130). Photoelectric converter 140 generates second electrical signal 14 by converting dispersion-compensated optical carrier wave 13 into an electrical signal (S140).

Accordingly, the arbitrary waveform generation method according to the present embodiment can generate, from an arbitrary waveform of first electrical signal 10, an arbitrary waveform of second electrical signal 14 which has a higher frequency than first electrical signal 10. It should be noted that arbitrary waveform generation device 100 can continuously generate second electrical signal 14 by using a continuous first electrical signal 10.

Moreover, the arbitrary waveform generation method need not include step S110 of generating optical carrier wave 11. In such a case, the arbitrary waveform generation method may include a step of receiving an input of optical carrier wave 11, in place of step S110.

Advantageous Effects, Etc.

In this manner, arbitrary waveform generation device 100 according to the present embodiment is an arbitrary waveform generation device that generates, from an arbitrary waveform of first electrical signal 10, an arbitrary waveform of second electrical signal 14 having a frequency higher than a frequency of first electrical signal 10. Arbitrary waveform generation device includes: modulator 120 that modulates, with first electrical signal 10, optical carrier wave 11 which is dispersed to have a central wavelength that varies with time; dispersion compensator 130 that performs dispersion compensation on optical carrier wave 12 modulated with first electrical signal 10; and photoelectric converter 140 that converts optical carrier wave 13 which has been dispersion-compensated into an electrical signal to generate second electrical signal 14.

Accordingly, arbitrary waveform generation device 100 can generate second electrical signal 14 (for example, a microwave) which is equivalent to a duplicate of a temporally-contracted first electrical signal 10, by performing modulation with first optical carrier wave 10 and then dispersion compensation and photoelectric conversion on optical wave carrier wave 11 which is dispersed to have a central wavelength that varies with time. Specifically, arbitrary waveform generation device 100 can generate, from an arbitrary waveform of first electrical signal 10, an arbitrary waveform of second electrical signal 14 which has a higher frequency than first electrical signal 10. An arbitrary waveform of first electrical signal 10 which has a lower frequency can be generated using a low-cost, typical arbitrary waveform generator. Furthermore, in the generation of an arbitrary waveform of second electrical signal 14, optical carrier wave 11 which is dispersed to have a central wavelength that varies with time can be used, and thus it is not necessary to perform spectral shaping in the spectral domain of the optical pulse. Therefore, an expensive optical wavelength selection switch becomes unnecessary, and cost-reduction of arbitrary waveform generation device 100 can be realized. In addition, in arbitrary waveform generation using an optical wavelength selection switch, waveform changing is limited by the refresh rate of LCOS, etc. On the other hand, since arbitrary waveform generation device 100 according to the present embodiment is not affected by the refresh rate of the optical wavelength selection switch, arbitrary waveform generation device 100 can switch the waveform of second electrical signal 14 in a shorter time.

Furthermore, for example, in arbitrary waveform generation device 100 according to the present embodiment, the central wavelength of optical carrier wave 11 may increase with time, and dispersion compensator 130 may include an optical dispersion medium in which propagation time of light decreases with an increase in a wavelength of the light.

Accordingly, a single mode fiber, or the like, can be used as dispersion compensator 130, and thus it is possible to realize further cost-reduction of arbitrary waveform generation device 100 than when a dispersion compensation fiber is used.

Furthermore, for example, arbitrary waveform generation device 100 according to the present embodiment may further include optical carrier wave generator 110 that generates optical carrier wave 11 from light having a predetermined wavelength band, using tunable filter 112.

Accordingly, by using tunable filter 112, optical carrier wave 11 which is dispersed to have a wavelength that varies with time can be generated from light of a predetermined wavelength band. Therefore, a simpler light source can be used than when generating optical carrier wave 11 from an optical pulse, and thus further cost-reduction of arbitrary waveform generation device 100 can be realized.

Furthermore, for example, in arbitrary waveform generation device 100 according to the present embodiment, second electrical signal 14 may have a frequency of at least 100 megahertz to less than 100 gigahertz.

Accordingly, an arbitrary waveform of a so-called microwave can be generated.

Although arbitrary waveform generation device 100 according to one or more aspects of the present invention is described above based on an embodiment, the present invention is not limited to the foregoing embodiment. The one or more aspects of the present invention may include those forms obtained by various modifications to the foregoing embodiment that may be conceived by those skilled in the art as well as forms obtained by combining structural components in different embodiments, for as long as they do not depart from the essence of the present invention.

For example, although optical carrier wave 11 having a central wavelength that increases with time is used in the foregoing embodiment, the optical carrier wave is not limited to this. For example, an optical carrier wave having a central wavelength that decreases with time may be used. Specifically, the first central wavelength of a first portion of an optical carrier wave may be longer than a second central wavelength of a second portion of an optical carrier wave which is located temporally after the first portion. In this case, an optical dispersion medium (for example, a dispersion compensation fiber) in which propagation time increases as the wavelength of light increases can be used as dispersion compensator 130.

INDUSTRIAL APPLICABILITY

The arbitrary waveform generation device according to an aspect of the present invention can be used as an arbitrary waveform generator capable of generating a microwave arbitrary waveform.

REFERENCE SIGNS LIST

10 first electrical signal
11, 12, 13 optical carrier wave
14 second electrical signal
100 arbitrary waveform generation device
110 optical carrier wave generator
111 wide-band light source
112 variable waveform filter
113 pulse light source
114 disperser
120 modulator
130 dispersion compensator
140 photoelectric converter

The invention claimed is:

1. An arbitrary waveform generation device that generates, from an arbitrary waveform of a first electrical signal, an arbitrary waveform of a second electrical signal having a frequency higher than a frequency of the first electrical signal, the arbitrary waveform generation device comprising:
    a modulator that modulates, with the first electrical signal, an optical carrier wave which is dispersed to have a central wavelength that varies with time;
    a dispersion compensator that performs dispersion compensation on the optical carrier wave modulated with the first electrical signal; and
    a photoelectric converter that converts the optical carrier wave which has been dispersion-compensated into the second electrical signal, wherein
    the first electrical signal is a signal that has been arbitrarily modulated in intensity with time and is in a band ranging from at least 1 kilohertz to below 100 megahertz, and
    the second electrical signal is equivalent to a temporally-contracted duplicate of the first electrical signal.

2. The arbitrary waveform generation device according to claim 1, wherein
    the central wavelength of the optical carrier wave increases with time, and
    the dispersion compensator includes an optical dispersion medium in which propagation time of light decreases with an increase in a wavelength of the light.

3. The arbitrary waveform generation device according to claim 1, wherein
    the central wavelength of the optical carrier wave decreases with time, and
    the dispersion compensator includes an optical dispersion medium in which propagation time of light increases with an increase in a wavelength of the light.

4. The arbitrary waveform generation device according to claim 1, further comprising:
    an optical carrier wave generator that generates the optical carrier wave from light having a predetermined wavelength band, using a tunable filter.

5. The arbitrary waveform generation device according to claim 1, wherein
    the second electrical signal has a frequency of at least 100 megahertz to less than 100 gigahertz.

6. An arbitrary waveform generation method of generating, from an arbitrary waveform of a first electrical signal, an arbitrary waveform of a second electrical signal having a frequency higher than a frequency of the first electrical signal, the arbitrary waveform generation method comprising:
    modulating, with the first electrical signal, an optical carrier wave which is dispersed to have a central wavelength that varies with time;
    performing dispersion compensation on the optical carrier wave modulated with the first electrical signal; and
    converting the optical carrier wave which has been dispersion-compensated into the second electrical signal, wherein
    the first electrical signal is a signal that has been arbitrarily modulated in intensity with time and is in a band ranging from at least 1 kilohertz to below 100 megahertz, and
    the second electrical signal is equivalent to a temporally-contracted duplicate of the first electrical signal.

* * * * *